United States Patent
Morita et al.

(10) Patent No.: US 10,396,699 B2
(45) Date of Patent: Aug. 27, 2019

(54) ANOMALY DIAGNOSING DEVICE AND ANOMALY DIAGNOSING METHOD

(71) Applicant: FANUC CORPORATION, Yamanashi (JP)

(72) Inventors: Yuuki Morita, Yamanashi-ken (JP); Kenji Takahashi, Yamanashi-ken (JP); Tadashi Okita, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/010,953

(22) Filed: Jun. 18, 2018

(65) Prior Publication Data

US 2018/0375458 A1    Dec. 27, 2018

(30) Foreign Application Priority Data

Jun. 23, 2017  (JP) .................................. 2017-123065

(51) Int. Cl.
*H02P 29/024* (2016.01)
*H02P 29/032* (2016.01)

(52) U.S. Cl.
CPC .......... *H02P 29/026* (2013.01); *H02P 29/032* (2016.02)

(58) Field of Classification Search
CPC .................................................. H02P 29/024
USPC ............................... 318/400.21, 400.01, 700
See application file for complete search history.

(56) References Cited

U.S. PATENT DOCUMENTS 6,515,446 B1 *  2/2003 Koide ................... B60L 3/0038
                                                          318/700

FOREIGN PATENT DOCUMENTS

| JP | 11252986 A | 9/1999 |
|---|---|---|
| JP | 200432849 A | 1/2004 |
| JP | 2005102409 A | 4/2005 |
| JP | 2005304119 A | 10/2005 |
| JP | 201041890 A | 2/2010 |
| JP | 2012147531 A | 8/2012 |
| JP | 201338950 A | 2/2013 |
| JP | 2013255330 A | 12/2013 |
| JP | 2015233372 A | 12/2015 |
| JP | 20161945 A | 1/2016 |
| JP | 201610188 A | 1/2016 |
| JP | 2016201922 A | 12/2016 |
| JP | 6420405 B1 | 11/2018 |

OTHER PUBLICATIONS

English Abstract and Machine Translation for Japanese Publication No. 2013-038950 A, published Feb. 21, 2013, 14 pgs.

(Continued)

*Primary Examiner* — David Luo
(74) *Attorney, Agent, or Firm* — Fredrikson & Byron, P.A.

(57) ABSTRACT

An anomaly diagnosing device diagnoses an anomaly in a single motor driven by multiple motor drive units. The multiple motor drive units supply AC currents to multiple multi-phase windings of the motor to drive the motor. The anomaly diagnosing device includes: a power consumption calculator for calculating power consumption in each of the multi-phase windings; a power difference calculator for calculating a difference in power consumption between the multi-phase windings; and a determination unit for determining that an anomaly is occurring when the absolute value of the difference has exceeded a threshold for a predetermined period of time.

11 Claims, 4 Drawing Sheets

(56) References Cited

OTHER PUBLICATIONS

English Abstract and Machine Translation for Japanese Publication No. 2015-233372 A, published Dec. 24, 2015, 8 pgs.
English Abstract and Machine Translation for Japanese Publication No. 2013-255330 A, published Dec. 19, 2013, 7 pgs.
English Abstract and Machine Translation for Japanese Publication No. 2010-041890 A, published Feb. 18, 2010, 9 pgs.
English Abstract and Machine Translation for Japanese Publication No. 2016-010188 A, published Jan. 18, 2016, 15 pgs.
English Abstract and Machine Translation for Japanese Publication No. 2004-032849 A, published Jan. 29, 2004, 10 pgs.
English Abstract and Machine Translation for Japanese Publication No. 2005-304119 A, published Oct. 27, 2005, 9 pgs.
English Abstract and Machine Translation for Japanese Publication No. 11-252986 A, published Sep. 17, 1999, 10 pgs.
English Abstract and Machine Translation for Japanese Publication No. 6420405 B1, published Nov. 7, 2018, 11 pgs.
English Abstract and Machine Translation for Japanese Publication No. 2016-201922 A, published Dec. 1, 2016, 10 pgs.
English Abstract and Machine Translation for Japanese Publication No. 2016-001945 A, published Jan. 7, 2016, 8 pgs.
English Abstract and Machine Translation for Japanese Publication No. 2012-147531 A, published Aug. 2, 2012, 13 pgs.
English Abstract and Machine Translation for Japanese Publication No. 2005-102409 A, published Apr. 14, 2005, 7 pgs.

\* cited by examiner

ANOMALY DIAGNOSING DEVICE AND ANOMALY DIAGNOSING METHOD

CROSS-REFERENCE TO RELATED APPLICATION

This application is based upon and claims the benefit of priority from Japanese Patent Application No. 2017-123065 filed on Jun. 23, 2017, the contents of which are incorporated herein by reference.

BACKGROUND OF THE INVENTION

Field of the Invention

The present invention relates to an anomaly diagnosing device and an anomaly diagnosing method for diagnosing an anomaly in a single motor driven by a plurality of motor drive units.

Description of the Related Art

Japanese Patent Laid-Open Publication No. 2005-102409 discloses a printing apparatus in which anomalies relating to a motor drive for governing a motor are detected. Briefly, the printing apparatus includes: a plurality of phase detecting circuits which are each connected to a different motor phases (A-phase, *A-phase, B-phase, *B-phase) and each formed of a first detecting circuit for detecting anomalies relating to the pulses output to the motor phase and a second detecting circuit for detecting overcurrent in the motor phase; and a logic output means for issuing logical outputs indicating an anomaly relating to the motor drive unit based on the detection result from the multiple phase detecting circuits.

SUMMARY OF THE INVENTION

However, the configuration disclosed by Japanese Laid-Open Patent Publication No. 2005-102409 is one that detects anomalies in a single motor drive unit that drives a single motor, so that there is no consideration as to detection of an anomaly in a single motor operated by multiple motor drive units.

It is therefore an object of the present invention to provide an anomaly diagnosing device and an anomaly diagnosing method capable of diagnosing an anomaly in a single motor driven by multiple motor drive units.

According to a first aspect of the present invention, an anomaly diagnosing device for diagnosing an anomaly in a single motor driven by a plurality of motor drive units, wherein the multiple motor drive units calculate a plurality of voltage command values based on a position command or a velocity command given by a numerical control device, and supply AC currents to a plurality of multi-phase windings of the motor, based on the calculated voltage command values, thereby driving the motor, includes: a power consumption calculator configured to calculate power consumption in each of the multi-phase windings; a power difference calculator configured to calculate a difference in power consumption between the multi-phase windings or a difference between average power consumption of the multiple multi-phase windings and the power consumption of each of the multi-phase windings; and a determination unit configured to determine that an anomaly is occurring when an absolute value of the difference has exceeded a threshold for a predetermined period of time.

According to a second aspect of the present invention, an anomaly diagnosing method for diagnosing an anomaly in a single motor driven by a plurality of motor drive units, wherein the motor drive units calculate a plurality of voltage command values based on a position command or a velocity command given by a numerical control device, and supply AC currents to a plurality of multi-phase windings of the motor, based on the calculated voltage command values, thereby driving the motor, includes: a power consumption calculating step of calculating power consumption in each of the multi-phase windings; a power difference calculating step of calculating a difference in power consumption between the multi-phase windings or a difference between average power consumption of the multi-phase windings and the power consumption of each of the multi-phase windings; and a determining step of determining that an anomaly is occurring when an absolute value of the difference has exceeded a threshold for a predetermined period of time.

According to the present invention, it is possible with a simple configuration to diagnose an anomaly in a single motor driven by multiple motor drive units.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

An anomaly diagnosing device and an anomaly diagnosing method according to the present invention will be detailed hereinbelow by describing preferred embodiments with reference to the accompanying drawings.

Figure 1:
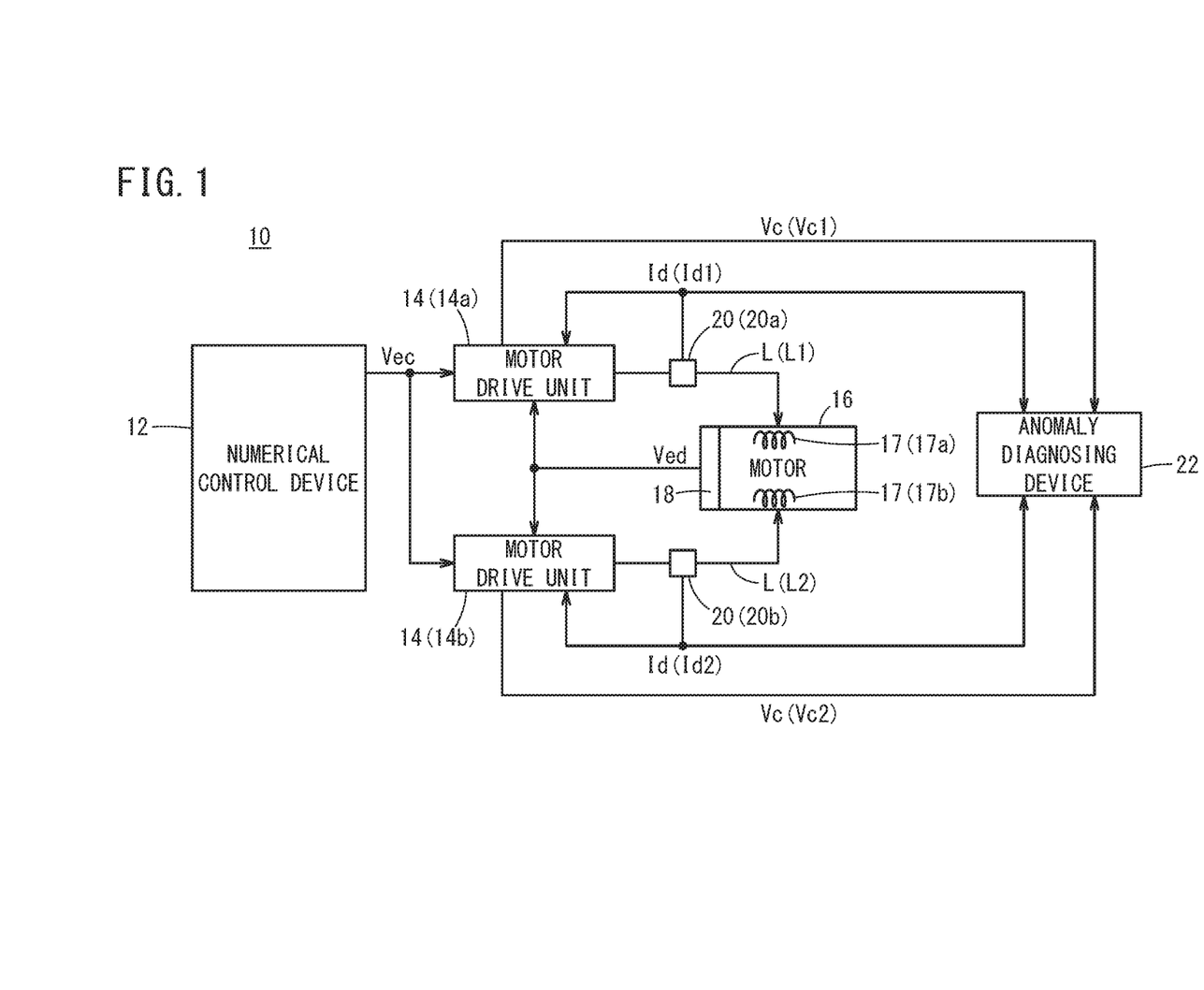
FIG. 1 is a schematic configuration diagram of an anomaly diagnosis system according to an embodiment.

FIG. 1 is a schematic configuration diagram of an anomaly diagnosis system 10. The anomaly diagnosis system 10 includes a numerical control device 12, a plurality of motor drive units 14, a motor 16, a rotational velocity detector 18, current detectors 20, and an anomaly diagnosing device 22.

In this embodiment, for simplicity's sake, it is assumed that two motor drive units 14 are used to control rotation of a single motor 16. In order to distinguish the two motor drive units 14 from each other, one motor drive unit 14 may be denoted by 14*a* and the other motor drive unit 14 by 14*b*.

The motor 16 is a synchronous motor. The motor 16 has two multi-phase windings 17 corresponding to the two motor drive units 14 (14*a*, 14*b*). The multi-phase winding 17 may be a two-phase winding, a three-phase winding or a four or more phase winding. In the present embodiment, the multi-phase winding 17 is a three-phase winding having U-phase, V-phase, W-phase. The multi-phase winding 17 corresponding to the motor drive unit 14*a* may be referred to as a first multi-phase winding 17*a* and the multi-phase winding 17 corresponding to the motor drive unit 14b may be referred to as a second multi-phase winding 17b. The first multi-phase winding 17a and the second multi-phase winding 17b are formed in the stator of the motor 16.

In this way, by providing a plurality of multi-phase windings 17 in the motor 16, it is possible to increase the power (rotational force) of the motor 16. The two motor drive units 14 (14a, 14b) and the two multi-phase windings 17 (17a, 17b) are connected by multi-phase lead wires L (L1, L2). In the present embodiment, the motor 16 is a synchronous motor but it may be a motor (e.g., an induction motor) other than the synchronous motor.

In order to control the motor 16, the numerical control device 12 outputs velocity commands or position commands to the two motor drive units 14 (14a, 14b). In the present embodiment, it is assumed that the numerical control device 12 outputs velocity commands to the two motor drive units 14 (14a, 14b). Hereinafter, the velocity command is denoted by Vec. The velocity commands Vec output to the two motor drive units 14 (14a, 14b) are identical.

Based on the velocity command Vec, the two motor drive units 14 (14a, 14b) apply voltages to the two multi-phase windings 17 (17a, 17b) of the motor 16 to supply AC currents to the two multi-phase windings 17. As a result, the motor 16 rotates (is driven). The motor drive unit 14a supplies a multi-phase AC current to the first multi-phase winding 17a of the motor 16 via the lead wire L1 and the motor drive unit 14b supplies a multi-phase AC current to the second multi-phase winding 17b of the motor 16 via the lead wire L2.

Though details of the configuration of the motor drive unit 14 will be described later, the motor drive unit 14 (14a, 14b) generates (calculates) a voltage command value Vc (Vc1, Vc2) based on the velocity command Vec and supplies an AC current to the multi-phase winding 17 (17a, 17b) based on the voltage command value Vc thus obtained.

The rotational velocity detector 18 is a sensor for detecting a rotational speed value (rotational velocity value of the rotary shaft) Ved of the motor 16. The rotational velocity detector 18 is made up from an encoder and others. The rotational velocity value Ved detected by the rotational velocity detector 18 is sent to the two motor drive units 14 (14a, 14b).

The current detector 20 is arranged on each of the lead wires L (L1, L2) to detect a multi-phase current value (AC current value) Id supplied from each of the two motor drive units 14 (14a, 14b) to the motor 16. The current detector 20 for detecting the multi-phase current value Id (Id1) flowing through the first multi-phase winding 17a may be denoted by 20a whereas the current detector 20 for detecting the multi-phase current value Id (Id2) flowing through the second multi-phase winding 17b may be denoted by 20b. The current value Id1 detected by the current detector 20a is sent to the motor drive unit 14a and the anomaly diagnosing device 22, and the current value Id2 detected by the current detector 20b is sent to the motor drive unit 14b and the anomaly diagnosing device 22.

The two motor drive units 14 (14a, 14b), based on the rotational velocity value Ved detected by the rotational velocity detector 18 and the current values Id (Id1, Id2) detected by the current detectors 20 (20a, 20b), performs feedback control on the motor 16.

The anomaly diagnosing device 22 diagnoses whether the motor 16 is driven normally or abnormally. Examples of abnormality in the driving of the motor 16 include a case where the motor 16 is driven with some multi-phase winding 17 short-circuited, a case where the motor 16 is driven with some multi-phase winding 17 broken, a case where the circuit of the motor drive unit 14 itself is broken down, and the like.

The anomaly diagnosing device 22, based on power consumption Pc in each multi-phase winding 17, diagnoses whether or not the motor 16 is driven normally. The anomaly diagnosing device 22 calculates power consumption Pc in each multi-phase winding 17, based on the two voltage command values Vc (Vc1, Vc2) generated by the two motor drive units 14 (14a, 14b) following the velocity command Vec and also on the two current values Id (Id1, Id2) detected by the two current detectors 20 (20a, 20b). The anomaly diagnosing device 22 will be described later in detail. The power consumption Pc in the first multi-phase winding 17a may be denoted by Pc1 and the power consumption Pc in the second multi-phase winding 17b may be denoted by Pc2.

Figure 2:
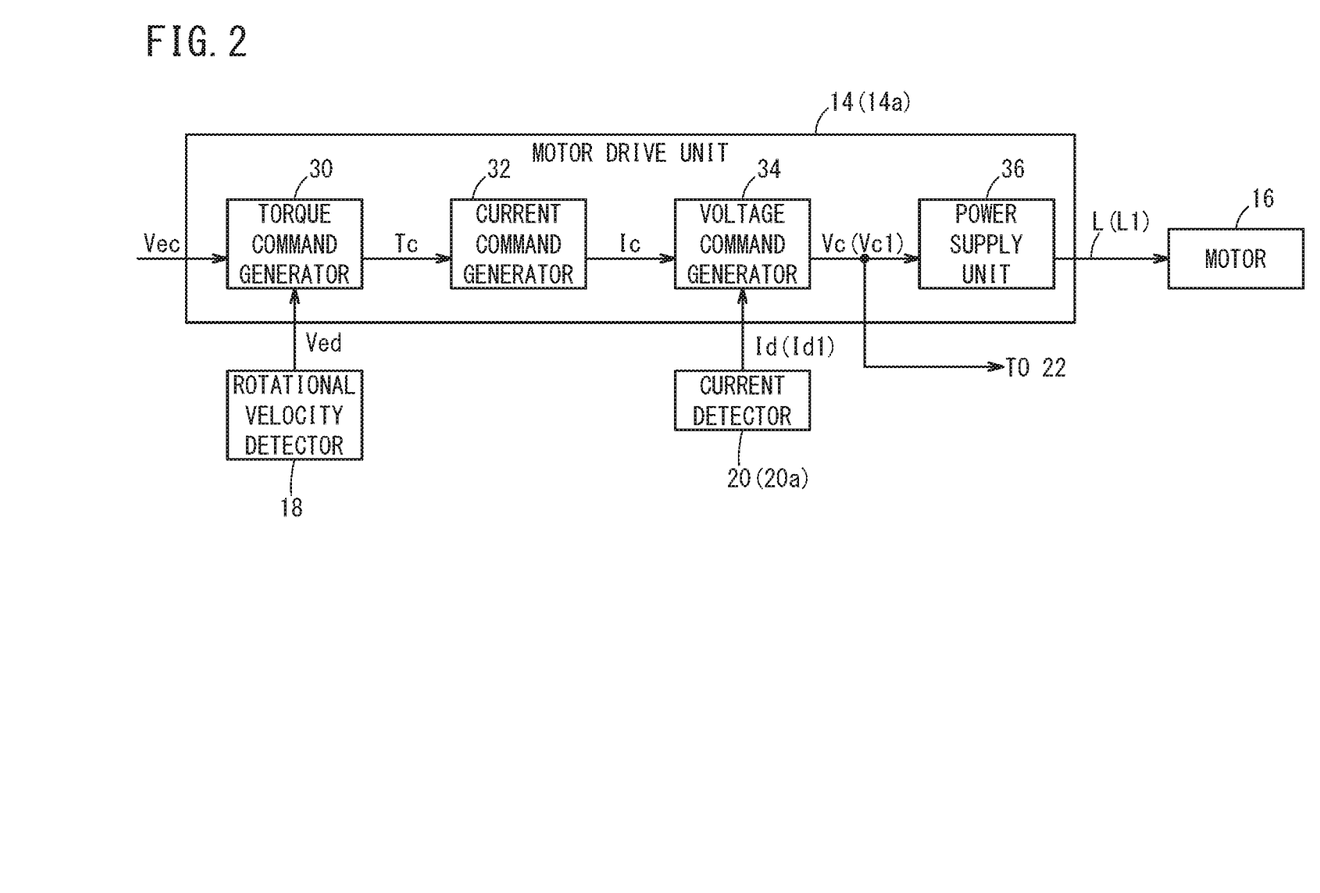
FIG. 2 is a diagram showing a configuration of a motor drive unit shown in FIG. 1.

FIG. 2 is a diagram showing a configuration of the motor drive unit 14a. Since the motor drive unit 14b has the same configuration as the motor drive unit 14a, the motor drive unit 14a will be described as a representative. The motor drive unit 14a includes a torque command generator 30, a current command generator 32, a voltage command generator 34, and a power supply unit 36.

The torque command generator 30 generates (calculates) a torque command value Tc based on the velocity command Vec given by the numerical control device 12. The torque command generator 30 generates the torque command value Tc using the rotational speed value Ved which is the feedback value detected by the rotational velocity detector 18. Specifically, the torque command generator 30 calculates the torque command value Tc based on the difference between the velocity command Vec and the rotational velocity value Ved. The torque command generator 30 outputs the generated (calculated) torque command value Tc to the current command generator 32.

The current command generator 32 generates (calculates) a current command value Ic based on the torque command value Tc sent from the torque command generator 30. The current command generator 32 outputs the generated (calculated) current command value Ic to the voltage command generator 34.

The voltage command generator 34 generates (calculates) the voltage command value Vc1 based on the current command value Ic sent from the current command generator 32. The voltage command generator 34 generates the voltage command value Vc1 using the multi-phase current value Id1 (current value of each phase of the U-phase, the V-phase, and the W-phase), which is the feedback value detected by the current detector 20a.

Specifically, the voltage command generator 34 generates the voltage command value Vc1 so that the current value Id1 detected by the current detector 20a becomes a multi-phase AC current that corresponds to the current command value Ic. Normally, when there is no failure in the circuit of the motor drive unit 14 (14a, 14b) itself and no multi-phase windings 17 (17a, 17b) are short-circuited or disconnected, the voltage command value Vc1 generated by the motor drive unit 14a takes the same value as the voltage command value Vc2 generated by the motor drive unit 14b. The voltage command generator 34 outputs the generated (calculated) voltage command value Vc1 to the power supply unit 36 and also to the anomaly diagnosing device 22.

The power supply unit 36 is a driver for driving the motor 16 and includes, for example, an inverter circuit or the like that converts a current supplied from a power supply into a multi-phase AC current. The power supply unit 36 applies a voltage to the first multi-phase winding 17a of the motor 16 based on the voltage command value Vc1 thereby supplying a multi-phase AC current to the first multi-phase winding 17a. In this way, the motor 16 is driven.

In the case of the motor drive unit 14b, the voltage command generator 34 generates the voltage command value Vc2 using the multi-phase current value Id2 (current value of each phase of the U-phase, the V-phase, and the W-phase), which is the feedback value detected by the current detector 20b. Further, the power supply unit 36, based on the voltage command value Vc2, supplies a multi-phase AC current to the second multi-phase winding 17b of the motor 16

Figure 3:
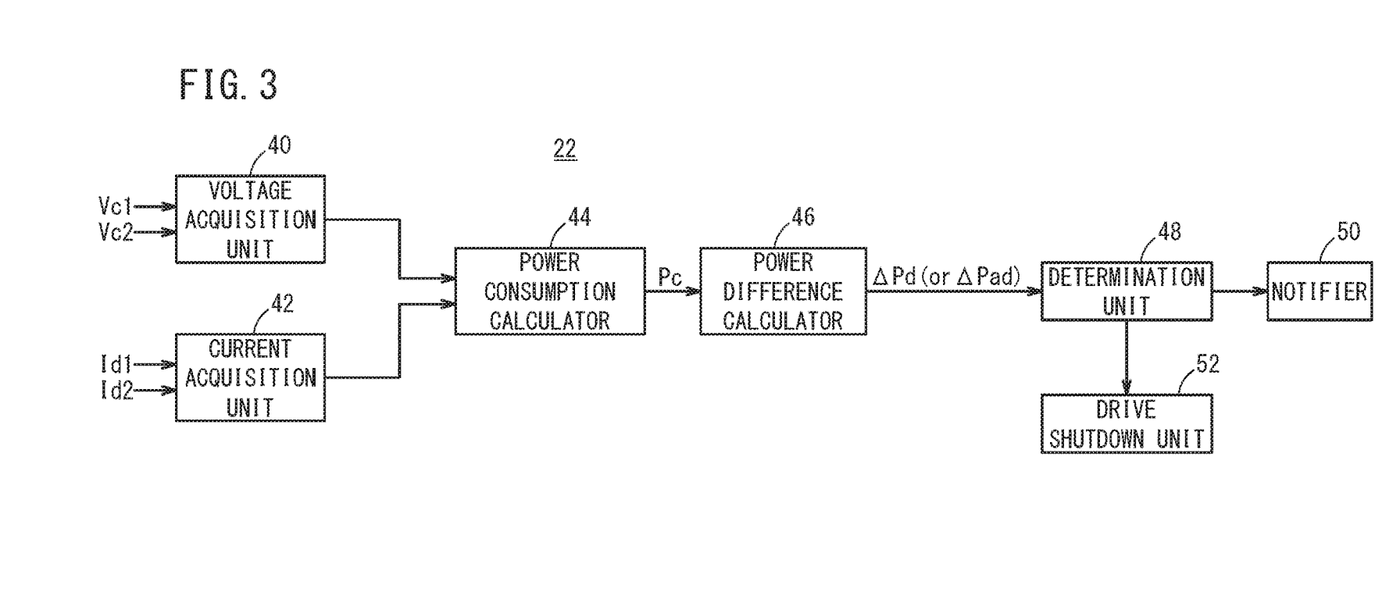
FIG. 3 is a diagram showing a configuration of an anomaly diagnosing device shown in FIG. 1.

FIG. 3 is a diagram showing a configuration of the anomaly diagnosing device 22. The anomaly diagnosing device 22 is constituted by a computer having a processor such as a CPU and a storage medium. The anomaly diagnosing device 22 includes a voltage acquisition unit 40, a current acquisition unit 42, a power consumption calculator 44, a power difference calculator 46, a determination unit 48, a notifier 50, and a drive shutdown unit 52.

The voltage acquisition unit 40 acquires the voltage command value Vc1 generated by the motor drive unit 14a and the voltage command value Vc2 generated by the motor drive unit 14b. The voltage acquisition unit 40 outputs the two obtained voltage command values Vc (Vc1, Vc2) to the power consumption calculator 44.

The current acquisition unit 42 acquires the current value Id1 of current that flows through the first multi-phase winding 17a and is detected by the current detector 20a; and the current value Id2 of current that flows through the second multi-phase winding 17b and is detected by the current detector 20b. The current acquisition unit 42 outputs the two obtained current values Id (Id1, Id2) to the power consumption calculator 44.

The power consumption calculator 44 calculates the power consumption Pc (Pc1, Pc2) at each multi-phase winding 17 (17a, 17b). Based on the acquired two voltage command values Vc (Vc1, Vc2) and the two current values Id (Id1, Id2), the power consumption calculator (44) 44 calculates the power consumption Pc (Pc1, Pc2) of each multi-phase winding 17 (17a, 17b).

Specifically, the power consumption calculator 44 calculates the power consumption Pc1 at the first multi-phase winding 17a based on the voltage command value Vc1 and the current value Id1, and calculates the power consumption Pc2 at the second multi-phase winding 17b based on the voltage command value Vc2 and the current value Id2. Thus, it is possible to calculate the power consumption easily. The power consumption calculator 44 outputs the calculated power consumption Pc (Pc1, Pc2) at each of the multi-phase windings 17 (17a, 17b) to the power difference calculator 46.

The power difference calculator 46 calculates a difference $\Delta Pd$ in power consumption Pc (Pc1, Pc2) between the multi-phase windings 17 (17a, 17b), that is, the difference $\Delta Pd$ between the power consumption Pc1 at the first multi-phase winding 17a and the power consumption Pc2 at the second multi-phase winding 17b. The power difference calculator 46 can determine the difference $\Delta Pd$ using an equation of $\Delta Pd=Pc1-Pc2$.

The determination unit 48 includes a clock circuit for measuring time. This clock circuit increments a count value C every given cycle thereby measuring time. The determination unit 48 determines that an anomaly is taking place when the absolute value of the difference $\Delta Pd$ calculated by the power difference calculator 46 has continuously exceeded a threshold TH1 ($|\Delta Pd1|=|Pc1-Pc2|>TH1$) for a predetermined time period.

The reason for judging whether or not the absolute value of the difference $\Delta Pd$ exceeds the threshold TH1 is that, for example, when the wiring of the first multi-phase winding 17a is normal while the second multi-phase winding 17b is short-circuited or disconnected, the absolute value of the difference $\Delta Pd$ between the power consumption Pc1 of the first multi-phase winding 17a and the power consumption Pc2 of the second multi-phase winding 17b exceeds the threshold TH1. The reason for determining whether or not the predetermined time has elapsed with the absolute value of the difference $\Delta Pd$ exceeding the threshold TH1 is to prevent erroneous determination of anomaly.

When the determination unit 48 determines that the motor 16 is driven abnormally, the notifier 50 and the drive shutdown unit 52 perform an alarm process.

When it is determined that the motor 16 is driven abnormally, the notifier 50 gives an alarm to the operator as an alarm process. Thereby, the operator can recognize the anomaly of the motor 16 driven. The notifier 50 may include a display unit (not shown) and display an alarm on the display unit to alert the operator. In addition, the notifier 50 may include a speaker or a light emitting unit (not shown) and give an alarm by sound or light.

In addition, the notifier 50 may display an alarm on a display unit of the numerical control device 12. Further, the notifier 50 may give an alarm using a speaker provided outside or may give an alarm by causing a light emitting unit provided outside to emit light.

When it is determined that the motor 16 is driven abnormally, the drive shutdown unit 52 stops the motor 16 driven by the two motor drive units 14 (14a, 14b) by as an alarm process. Thus, it is possible to prevent the motor 16 from being broken due to abnormal driving of the motor 16.

When it is determined that the motor 16 is driven abnormally, the drive shutdown unit 52 outputs an emergency stop signal to the two motor drive units 14 (14a, 14b) thereby stopping the driving of the motor 16. When an emergency stop signal comes to the two motor drive units 14 (14a, 14b), the two motor drive units 14 (14a, 14b) stop power supply to the motor 16. For example, the voltage command generator 34 may prohibit the output of the voltage command value Vc (Vc1, Vc2) to the power supply unit 36 thereby stopping supply of power to the motor 16.

In the present embodiment, as the alarm processing, both the alarm raising and the stoppage of the driving of the motor 16 are performed when it is determined that the motor 16 is driven abnormally. However, only one of them may be performed as the alarm processing.

Figure 4:
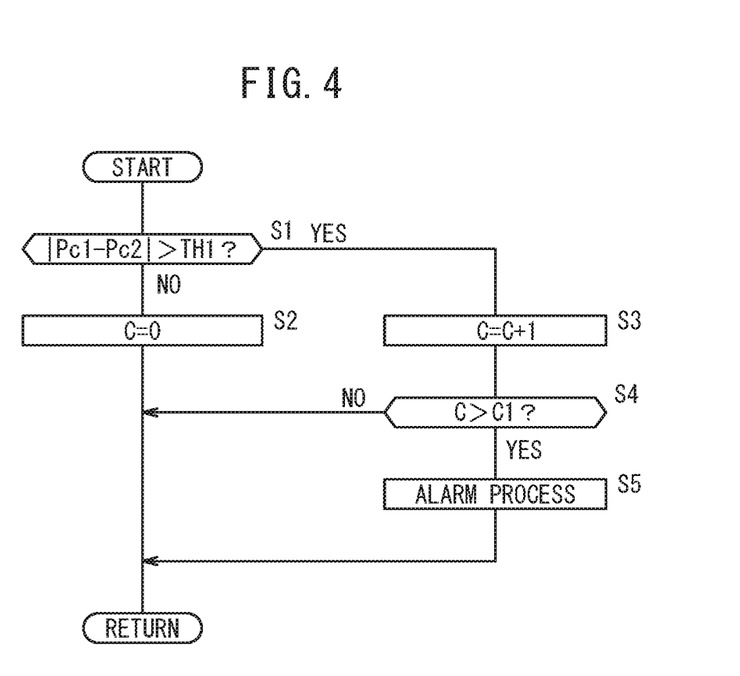
FIG. 4 is a flowchart showing the operation of the anomaly diagnosing device shown in FIG. 1.

Next, the operation of the anomaly diagnosing device 22 will be described with reference to the flowchart shown in FIG. 4. The operation shown in FIG. 4 is executed at a predetermined cycle. Further, it is assumed that the rotational velocity detector 18 and the current detectors 20 (20a, 20b) detect the rotational velocity value Ved and the current values Id (Id1, Id2) at a cycle equal to or shorter than the aforementioned predetermined cycle. Then, it is also assumed that the voltage command generator 34 generates the voltage commands value Vc (Vc1, Vc2) at the cycle equal to or shorter than the predetermined cycle, the power consumption calculator 44 calculates the power consumption Pct, Pc2 at a cycle equal to or shorter than the predetermined cycle, and the power difference calculator 46 calculates the difference $\Delta Pd$ at a cycle equal to or shorter than the predetermined cycle.

At step S1, the determination unit 48 determines whether or not the absolute value of the difference ΔPd between the power consumption Pc1 in the first multi-phase winding 17a and the power consumption Pc2 in the second multi-phase winding 17b, calculated by the power difference calculator 46, exceeds the threshold TH1 (|Pc1−Pc2|>TH1?).

If it is determined at step S1 that the absolute value of the difference ΔPd does not exceed the threshold TH1, that is, if it is determined that the absolute value of the difference ΔPd is equal to or less than the threshold TH1, the control goes to step S2. If it is determined at step S1 that the absolute value of the difference ΔPd exceeds the threshold TH1, the control goes to step S3.

At step S2, the determination unit 48 resets the count value C (C=0), and the operation is terminated.

At step S3, the determination unit 48 increments the count value C (C=C+1).

Next, at step S4, the determination unit 48 determines whether or not the present count value C is greater than a predetermined value C1. The predetermined value C1 is a value corresponding to a predetermined period of time. Therefore, at step S4, it is judged whether or not the predetermined period of time has elapsed while the state of the "YES at step S1" is maintained.

At step S4, when it is determined that the present count value C is equal to or less than the predetermined value C1, the operation is terminated. On the other hand, if it is determined at step S4 that the current count value C is greater than the predetermined value C1, the determination unit 48 determines that the motor 16 is driven abnormally, and the control goes to step S5.

At step S5, the alarm process is performed. Specifically, the notifier 50 gives an alarm to the operator, and the drive shutdown unit 52 stops the motor 16 driven by the two motor drive units 14 (14a, 14b), and the operation is terminated.

As described above, the anomaly diagnosing device 22 uses the difference ΔPd in power consumption Pc (Pc1, Pc2) between the multiple multi-phase windings 17 (17a, 17b) of the motor 16 and determines if the motor 16 is driven abnormally. Therefore, it is possible with a simple configuration to diagnose the driving anomaly of the single motor 16 driven by the two motor drive units 14 (14a, 14b).

In the above embodiment, the motor 16 having two multi-phase windings 17 has been described as an example for simplicity, but the motor 16 may have three or more multi-phase windings 17. In this case, a plurality of differences ΔPd are calculated. Therefore, when at least one of the absolute values of the multiple differences ΔPd continuously exceeds the threshold TH1 for a predetermined period of time, the determination unit 48 determines that the motor 16 is driven abnormally.

VARIATIONAL EXAMPLES

The above-described embodiment can also be modified as follows.

Variational Example 1

In Variational Example 1, the determination unit 48 determines that the motor 16 is driven abnormally when the absolute value of a difference ΔPad between the average power consumption Pa of the multiple multi-phase windings 17 and the power consumption Pc of any of multi-phase windings 17 has exceeded a threshold TH2 continuously for a predetermined period of time.

Also in this Variational Example 1, in order to make the description easy to understand, it is assumed that there are two motor drive units 14 and two multi-phase windings 17 of the motor 16. Further, the same components as those in the above embodiment are allotted with the same reference numerals.

In Variational Example 1, instead of the difference ΔPd, the power difference calculator 46 calculates a difference ΔPad between the average power consumption Pa of the two multi-phase windings 17 (17a, 17b) and the power consumption Pc of a multi-phase winding 17. The power difference calculator 46 may calculate the difference ΔPad (ΔPad1, ΔPad2) between the average power consumption Pa and the power consumption Pc (Pc1, Pc2) of each of the multi-phase windings 17 (17a, 17b).

The power difference calculator 46 can calculate the average power consumption Pa using the equation of Pa=(Pc1+Pc2)/2. The power difference calculator 46 can obtain the difference ΔPad1 between the average power consumption Pa and the power consumption Pc1 using ΔPad1=Pa−Pc1. Further, the power difference calculator 46 can obtain the difference ΔPad2 between the average power consumption Pa and the power consumption Pc2 using ΔPad2=Pa−Pc2.

When the absolute value of the difference ΔPad exceeds a threshold TH2 continuously for a predetermined period of time, the determination unit 48 determines that the motor 16 is driven abnormally. When a plurality of differences ΔPad (ΔPad1, ΔPad2) are calculated by the power difference calculator 46, the determination unit 48 determines that the motor 16 is driven abnormally when at least one of the absolute values of the calculated differences ΔPad continuously exceeds the threshold TH2 for a predetermined period of time.

The operation of the anomaly diagnosing device 22 of Variational Example 1 is the same as that of the above-described embodiment except step S1 of the flowchart shown in FIG. 4. In Variational Example 1, at step S1, it is determined whether or not the absolute value of the difference ΔPad exceeds the threshold TH2.

Variational Example 2

Although the anomaly diagnosing device 22 is provided separately from the numerical control device 12 and the motor drive unit 14 in the above embodiment and Variational Example 1, the numerical control device 12 may work as the anomaly diagnosing device 22. That is, the anomaly diagnosing device 22 may be provided in the numerical control device 12. This makes it unnecessary to additionally provide the anomaly diagnosing device 22, resulting in low costs.

Further, the motor drive unit 14 may work as the anomaly diagnosing device 22. That is, the anomaly diagnosing device 22 may be provided in the motor drive unit 14. In this case, the anomaly diagnosing device 22 may be provided in at least one of the multiple motor drive units 14, or the anomaly diagnosing device 22 may be provided in all of the multiple motor drive units 14. Thereby, there is no need to separately provide the anomaly diagnosing device 22, so that the costs can be reduced while anomaly diagnosis can be performed quickly.

Variational Example 3

In the above-described embodiment and Variational Examples 1 and 2, the control goes to step S5 when a predetermined period of time has elapsed in the state of the "YES at step S1" of FIG. 4 (YES at step S4). Instead, the control may go to step S5 soon after the condition becomes YES at step S1.

Variational Example 4

In the above-described embodiment and Variational Examples 1 to 3, the numerical control device 12 outputs the velocity command Vec to the two motor drive units 14 (14a, 14b). However, the velocity command Vec may be output to only one of the motor drive units 14. Here, in the description of Variational Example 4, the motor drive unit 14 that receives the velocity command Vec is called 14a and the motor drive unit 14 that does not receive the velocity command Vec is called 14b.

The motor drive unit 14a then outputs the torque command value Tc generated based on the velocity command Vec, or the current command value Ic generated based on the torque command value Tc, to the motor drive unit 14b. When the torque command value Tc is input to the motor drive unit 14b, the current command generator 32 of the motor drive unit 14b generates the current command value Ic based on the input torque command value Tc. When the current command value Ic is input to the motor drive unit 14b, the voltage command generator 34 of the motor drive unit 14b generates the voltage command value Vc2 based on the input current command value Ic and the current value Id2 which is a feedback value.

Variational Example 5

In the above embodiment and Variational Examples 1 to 4, the power consumption calculator 44 calculates the power consumption Pc in the multi-phase winding 17 based on the voltage command value Vc and the current value Id detected by the current detector 20. However, the calculator 44 may calculate the power consumption Pc in the multi-phase winding 17 based on the voltage command value Vc and the current command value Ic. Alternatively, a voltage detector for detecting the voltage applied to the multi-phase winding 17 may be provided so as to calculate the power consumption Pc based on the voltage value detected by the voltage detector and the current value Id detected by the current detector 20.

[Technical Ideas Obtained from the Embodiments]

Technical ideas that can be grasped from the above embodiment and Variational Examples 1 to 5 are described below.

<First Technical Idea>

An anomaly diagnosing device (22) diagnoses an anomaly in a single motor (16) driven by a plurality of motor drive units (14). The motor drive units (14) calculate a plurality of voltage command values (Vc) based on a position command or a velocity command given by a numerical control device (12), and supply AC currents to a plurality of multi-phase windings (17) of the motor (16), based on the calculated voltage command values (Vc), thereby driving the motor (16). The anomaly diagnosing device (22) includes: a power consumption calculator (44) configured to calculate power consumption (Pc) of each of the multi-phase windings (17); a power difference calculator (46) configured to calculate a difference (ΔPd) in power consumption (Pc) between the multi-phase windings (17) or a difference (ΔPad) between average power consumption (Pa) of the multi-phase windings (17) and the power consumption (Pc) of each of the multi-phase windings (17); and a determination unit (48) configured to determine that an anomaly is occurring when an absolute value of the difference (ΔPd or ΔPad) has exceeded a threshold (TH1 or TH2) for a predetermined period of time.

Thereby, it is possible with a simple configuration to diagnose an anomaly in a single motor (16) driven by the plurality of motor drive units (14).

The power difference calculator (46) may be configured to calculate differences (ΔPd) in power consumption (Pc) between three or more multi-phase windings (17) or differences (ΔPad) between the average power consumption (Pa) of the multi-phase windings (17) and the power consumption (Pc) of each of the multi-phase windings (17). The determination unit (48) may be configured to determine that an anomaly is occurring when, among the multiple calculated differences (ΔPd or ΔPad), at least one of the absolute values of the calculated differences (ΔPd or ΔPad) has continuously exceeded the threshold (TH1 or TH2) for the predetermined period of time. As a result, it is possible to diagnose an anomaly in a single motor (16) driven by the plurality of motor drive units (14).

The anomaly diagnosing device (22) may further include: a voltage acquisition unit (40) configured to acquire the voltage command values (Vc) calculated by the multiple motor drive units (14); and a current acquisition unit (42) configured to acquire the value (Id) of current flowing through each of the multi-phase windings (17). The power consumption calculator (44) may be configured to calculate the power consumption (Pc) of each of the multi-phase windings (17), based on the voltage command values (Vc) calculated by the motor drive units (14) and the value (Id) of current flowing through the individual multi-phase windings (17). As a result, it is possible to calculate power consumption easily.

The anomaly diagnosing device (22) may further include a notifier (50) configured to give an alarm when the determination unit (48) determines that an anomaly is occurring. This enables the operator to recognize an anomaly in the driving of the motor (16).

The anomaly diagnosing device (22) may further include a drive shutdown unit (52) configured to stop the motor (16) driven by the multiple motor drive units (14) when the determination unit (48) determines that an anomaly is occurring. Thereby, it is possible to prevent the motor (16) from being broken due to an anomaly in the driven motor (16).

The anomaly diagnosing device (22) may be provided in the motor drive unit (14). Thereby, there is no need to separately provide the anomaly diagnosing device (22), the costs can be reduced, and the anomaly diagnosis can be quickly performed.

<Second Technical Idea>

An anomaly diagnosing method diagnoses an anomaly in a single motor (16) driven by a plurality of motor drive units (14). The motor drive units (14) calculate a plurality of voltage command values (Vc) based on a position command or a velocity command given by a numerical control device (12), and supply AC currents to a plurality of multi-phase windings (17) of the motor (16), based on the calculated voltage command values (Vc), thereby driving the motor (16). The anomaly diagnosing method includes a power consumption calculating step of calculating power consumption (Pc) of each of the multi-phase windings (17); a power difference calculating step of calculating a difference (ΔPd) in power consumption (Pc) between the multi-phase windings (17) or a difference (ΔPad) between the average power consumption (Pa) of the multi-phase windings (17) and the power consumption (Pc) of each of the multi-phase windings (17); and a determining step of determining that an anomaly is occurring when the absolute value of the difference ($\Delta$Pd or $\Delta$Pad) has exceeded a threshold (TH1 or TH2) for a predetermined period of time.

Thereby, it is possible with a simple configuration to diagnose an anomaly in a single motor (16) driven by a plurality of motor drive units (14).

The power difference calculating step may calculate differences ($\Delta$Pd) in power consumption (Pc) between three or more multi-phase windings (17) or differences ($\Delta$Pad) between the average power consumption (Pa) of the multi-phase windings (17) and the power consumption (Pc) of each of the multi-phase windings (17). The determining step may determine that an anomaly is occurring when, among the calculated differences ($\Delta$Pd or $\Delta$Pad), at least one of the absolute values of the calculated differences ($\Delta$Pd or $\Delta$Pad) has continuously exceeded the threshold (TH1 or TH2) for the predetermined period of time. As a result, it is possible to diagnose an anomaly in a single motor (16) driven by the plurality of motor drive units (14).

The anomaly diagnosing method may further include: a voltage acquiring step of acquiring the voltage command values (Vc) calculated by the motor drive units (14); and a current acquiring step of acquiring a value (Id) of current flowing through each of the multi-phase windings (17). The power consumption calculating step may calculate the power consumption (Pc) of each of the multi-phase windings (17), based on the voltage command values (Vc) calculated by the motor drive units (14) and the value (Id) of current flowing through the individual multi-phase windings (17). This makes it possible to calculate the power consumption easily.

The anomaly diagnosing method may further include a notifying step of giving an alarm when the determining step determines that an anomaly is occurring. This enables the operator to recognize an anomaly in the motor (16).

The anomaly diagnosing method may further include a drive shutdown step of stopping the motor (16) driven by the motor drive units (14) when the determining step determines that an anomaly is occurring. Thereby, it is possible to prevent the motor (16) from being broken due to an anomaly in driven the motor (16).

It should be understood that the present invention is not limited to the above-described embodiment, and various alternative or additional configurations could be adopted therein based on the disclosed content of the present specification.

What is claimed is:

1. An anomaly diagnosing device for diagnosing an anomaly in a single motor driven by a plurality of motor drive units, wherein the motor drive units calculate a plurality of voltage command values based on a position command or a velocity command given by a numerical control device, and supply AC currents to a plurality of multi-phase windings of the motor, based on the calculated voltage command values, thereby driving the motor, comprising:
   a power consumption calculator configured to calculate power consumption of each of the multi-phase windings;
   a power difference calculator configured to calculate a difference in power consumption between the multi-phase windings or a difference between average power consumption of the multi-phase windings and the power consumption of each of the multi-phase windings; and
   a determination unit configured to determine that an anomaly is occurring when an absolute value of the difference has exceeded a threshold for a predetermined period of time.

2. The anomaly diagnosing device according to claim 1, wherein:
   the power difference calculator is configured to calculate differences in power consumption between three or more multi-phase windings or differences between the average power consumption of the multi-phase windings and the power consumption of each of the multi-phase windings; and
   the determination unit is configured to determine that an anomaly is occurring when, among the calculated differences, at least one of absolute values of the calculated differences has continuously exceeded the threshold for the predetermined period of time.

3. The anomaly diagnosing device according to claim 1, further comprising:
   a voltage acquisition unit configured to acquire the voltage command values calculated by the motor drive units; and
   a current acquisition unit configured to acquire a value of current flowing through each of the multi-phase windings, wherein
   the power consumption calculator is configured to calculate the power consumption of each of the multi-phase windings, based on the voltage command values calculated by the motor drive units and the value of current flowing through the individual multi-phase windings.

4. The anomaly diagnosing device according to claim 1, further comprising a notifier configured to give an alarm when the determination unit determines that an anomaly is occurring.

5. The anomaly diagnosing device according to claim 1, further comprising a drive shutdown unit configured to stop the motor driven by the motor drive units when the determination unit determines that an anomaly is occurring.

6. The anomaly diagnosing device according to claim 1, wherein the anomaly diagnosing device is provided in the motor drive unit.

7. An anomaly diagnosing method for diagnosing an anomaly in a single motor driven by a plurality of motor drive units, wherein the motor drive units calculate a plurality of voltage command values based on a position command or a velocity command given by a numerical control device, and supply AC currents to a plurality of multi-phase windings of the motor, based on the calculated voltage command values, thereby driving the motor, comprising:
   a power consumption calculating step of calculating power consumption of each of the multi-phase windings;
   a power difference calculating step of calculating a difference in power consumption between the multi-phase windings or a difference between average power consumption of the multi-phase windings and the power consumption of each of the multi-phase windings; and
   a determining step of determining that an anomaly is occurring when an absolute value of the difference has exceeded a threshold for a predetermined period of time.

8. The anomaly diagnosing method according to claim 7, wherein:
   the power difference calculating step calculates differences in power consumption between three or more multi-phase windings or differences between the average power consumption of the multi-phase windings and the power consumption of each of the multi-phase windings; and the determining step determines that an anomaly is occurring when, among the calculated differences, at least one of absolute values of the calculated differences has continuously exceeded the threshold for the predetermined period of time.

9. The anomaly diagnosing method according to claim 7, further comprising:

a voltage acquiring step of acquiring the voltage command values calculated by the motor drive units; and a current acquiring step of acquiring a value of current flowing through each of the multi-phase windings, wherein the power consumption calculating step calculates the power consumption of each of the multi-phase windings, based on the voltage command values calculated by the motor drive units and the value of current flowing through the individual multi-phase windings.

10. The anomaly diagnosing method according to claim 7, further comprising a notifying step of giving an alarm when the determining step determines that an anomaly is occurring.

11. The anomaly diagnosing method according to claim 7, further comprising a drive shutdown step of stopping the motor driven by the multiple motor drive units when the determining step determines that an anomaly is occurring.

* * * * *